United States Patent [19]
Gupta et al.

[11] Patent Number: 5,630,088
[45] Date of Patent: May 13, 1997

[54] VIRTUAL TO PHYSICAL ADDRESS TRANSLATION

[75] Inventors: Rajiv Gupta, Los Altos; Richard J. Carter, Menlo Park, both of Calif.

[73] Assignee: Hewlett-Packard Company, Palo Alto, Calif.

[21] Appl. No.: 401,585

[22] Filed: Mar. 9, 1995

[51] Int. Cl.$^6$ .................................................. G06F 12/08
[52] U.S. Cl. ................................................................ 395/417
[58] Field of Search ........................................ 395/412, 413, 395/416, 417, 419

[56] References Cited

U.S. PATENT DOCUMENTS

| | | | |
|---|---|---|---|
| 4,873,521 | 10/1989 | Dietrich et al. | 395/413 X |
| 5,210,841 | 5/1993 | Johnson | 395/412 X |
| 5,319,761 | 6/1994 | Chiarot et al. | 395/417 |
| 5,475,827 | 12/1995 | Lee et al. | 395/417 |
| 5,479,628 | 12/1995 | Olson et al. | 395/416 |
| 5,479,631 | 12/1995 | Manners et al. | 395/412 X |
| 5,497,469 | 3/1996 | Sakata et al. | 395/413 |

OTHER PUBLICATIONS

Robert J. Baron and Lee Higbie, "Memory-system Architecture," Computer Architecture, Addison-Wesley Publishing Company, 1992, pp. 174-229.

Primary Examiner—David L. Robertson

[57] ABSTRACT

A high-speed address translation look-aside buffer (TLB) for translating an explicit address, comprised of an index, a TLB index, and an offset, into a physical address. The TLB cooperates with a space register file having a plurality of space registers, each space register having an indirect address for a corresponding index value. The TLB includes a memory organized as N TLB entries, each entry having an entry space tag, a virtual tag, a valid bit, and a physical page number. A comparator is coupled to each entry which compares only the TLB index to the virtual tag. Each TLB entry further includes a matching bit memory for pre-storing the results of comparing the contents of the entry space tag with the contents (indirect address) of the space registers. The contents of the matching bit memories are then selected during the memory translation process to indicate the result of the prior comparison. The matching bit memories thus eliminate the need to access the space registers during the address translation process thereby substantially reducing the virtual-to-physical address translation time.

22 Claims, 7 Drawing Sheets

VIRTUAL TO PHYSICAL ADDRESS TRANSLATION

FIELD OF THE INVENTION

This application relates generally to the field of computer memory-system architecture and in particular, relates to improving performance in memory systems having a partitioned virtual address space.

BACKGROUND OF THE INVENTION

Virtual memory is a memory system used to increase the effectiveness of a computer's physical memory. Virtual memory maps the user's logical addresses to physical addresses, so parts of a program may reside at physical addresses that differ from the logical addresses.

In practice, the logical-address space of many computers is much larger than their physical-address space. For example, if a byte-addressed computer uses a 32-bit address, its logical-address space has $2^{32}$ memory locations, which is 4 GB. Few computers have that much physical memory (perhaps until recently) though many of them use 32-bit addresses. Consequently, until the advent of virtual memory, either the operating system restricted the size of a program to the size of physical memory, or a programmer had to use overlays or similar techniques to reduce the program's maximum physical size.

In a virtual-memory system, the operating system loads only part of a program in main memory at one time. When the active part of the program requests a memory reference, the CPU resolves the effective address exactly as it would if the computer did not have virtual memory. However, it does not send the effective address directly to its main-memory system. Instead, it sends it to a memory map, which is part of the virtual-memory hardware. The memory map is a system that translates virtual addresses into physical addresses. A good overview of virtual memory techniques appears in R. Baron and L. Higbie, Computer Architecture, Chapter 4 (Addison-Wesley Publishing Company, 1992).

Paging and segmentation are examples of techniques for mapping effective addresses into physical addresses. In a paging system, the virtual memory hardware divides logical addresses into two parts, page number and a word offset within the page. This is done by partitioning the bits of the addresses: the high order bits form the page number and the low order bits form the offset. When the system loads a page into memory, it always places the page beginning at a page boundary. The units of physical memory that hold pages are called page frames.

In a demand-page virtual-memory system, the memory map is called a page map. As part of the page map, the operating system maintains a page table. A page table consists of a number of page table entries, each holding information about a specific page. The virtual page number thus serves as an offset into the page table. A typical page-table entry includes a validity bit, a dirty bit, protection bits, and the page-frame number for the page.

Most paging systems keep their page tables in main memory, and the hardware may have a page table base register that points to the page table in memory. When the page table is in main memory, each main-memory access potentially requires the overhead of a second memory access: the addressing hardware must consult the page table to get the page-frame number for the memory reference. To avoid (minimize) the additional overhead, some hardware systems maintain, as part of the page map, a small cache memory called a translation look-aside buffer (TLB), which holds essentially the same information as part of the page table. In addition, it holds the virtual-page number so it can map the virtual page number to the corresponding page frame number. In general, a TLB holds entries only for the most recently accessed pages.

The effective address is the address the CPU generates to reference an instruction or variable in memory using the instruction-provided addressing modes such as base displacement and indexing but not using the address-translation mechanisms of virtual memory. This is usually the same as the compiler's logical address but not the same as the computer's physical address.

In the prior art, an effective address comprises at least two parts, which we will call the explicit address and the indirect address. A portion of the explicit address, to be called the index, serves as an index into a space register file. The contents of the space register file form the indirect address.

The effective address is formed by a concatenation of the indirect address bits and the explicit address bits, and may include all, some, or none of the index bits. The Most of the bits of the effective address (i.e., not the page offset bits) are classically used to access the translation look-aside buffer (TLB), which stores a page frame number or segment-base address (in a segmented system) which in turn forms part of the physical address. The TLB entry is said to match if its value is equal to the effective address used to access the TLB.

Conventional mechanisms do not begin the TLB access until the space register has been accessed and the full effective address is thus available. This serial access of the space register file and then the TLB increases the critical TLB path and therefore slows the overall memory system performance. In addition, if the TLB path is the critical stage in a pipelined computer design, the operating frequency of the design can be degraded as well, resulting in a degradation in overall system performance. The need remains, therefore, for improved methods and apparatus for implementing virtual memory architectures.

SUMMARY OF THE INVENTION

It is, therefore, an object of the invention to reduce the virtual-to-physical address translation time of a TLB.

This object is met, according to the invention, by eliminating the space register fetch and subsequent comparison during the critical address translation sequence. Instead, a space tag and matching bit memory cell are included in each TLB entry to prestore the results of a comparison between the contents of the space registers and the indirect address corresponding to the TLB entry contained in the space tag. The contents of the matching bit memories are then simply selected during the memory translation process to indicate the result of the prior comparison. The matching bit memories thus eliminate the need to access the space registers during the address translation process thereby substantially reducing the address translation time.

An advantage of the invention is that the invention can be applied to both of the prevalent addressing schemes.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
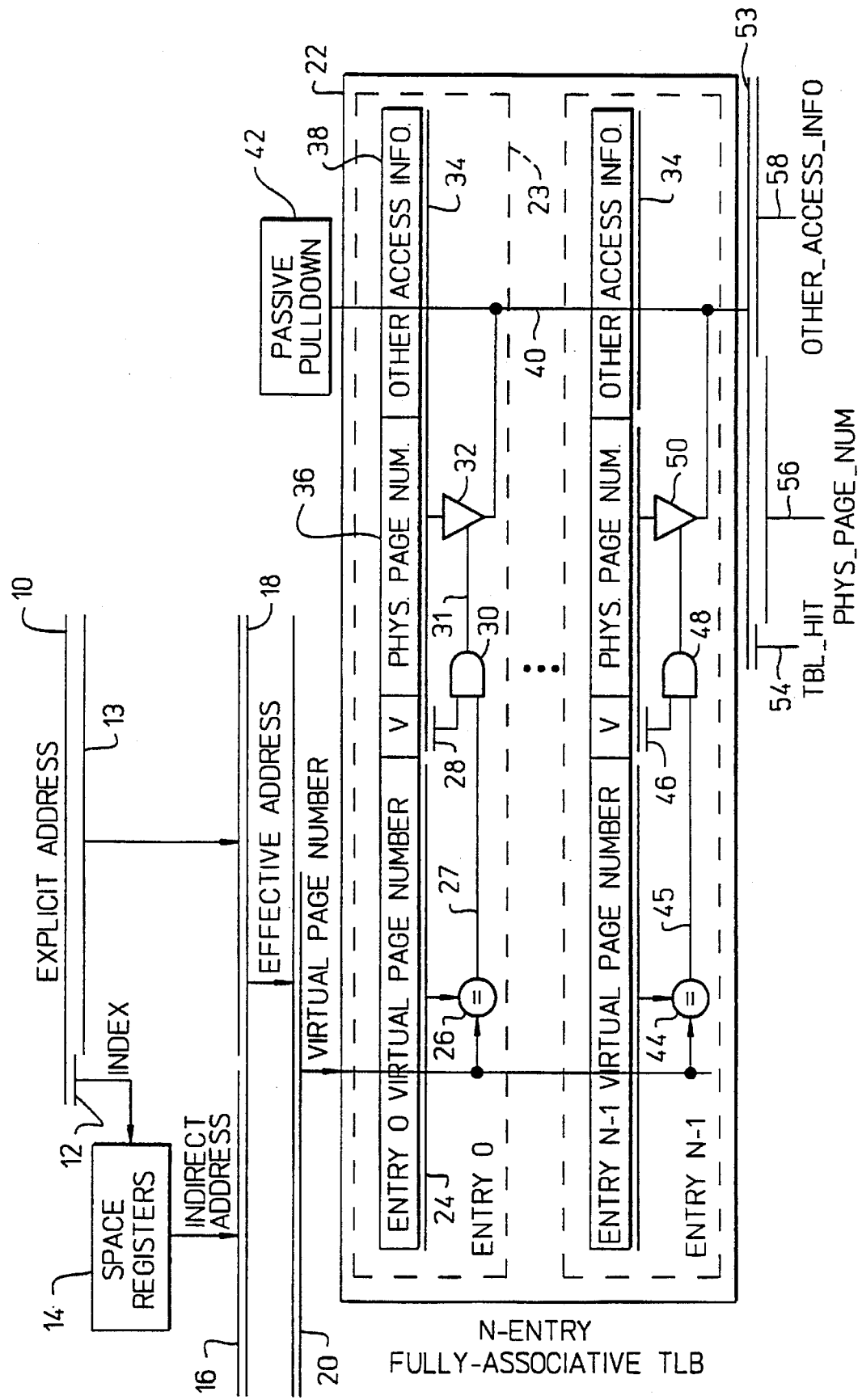
FIG. 1 is a partial schematic, partial block diagram of a known translation look-aside buffer (TLB) system in which index bits are not included in the effective address.
Figure 2:
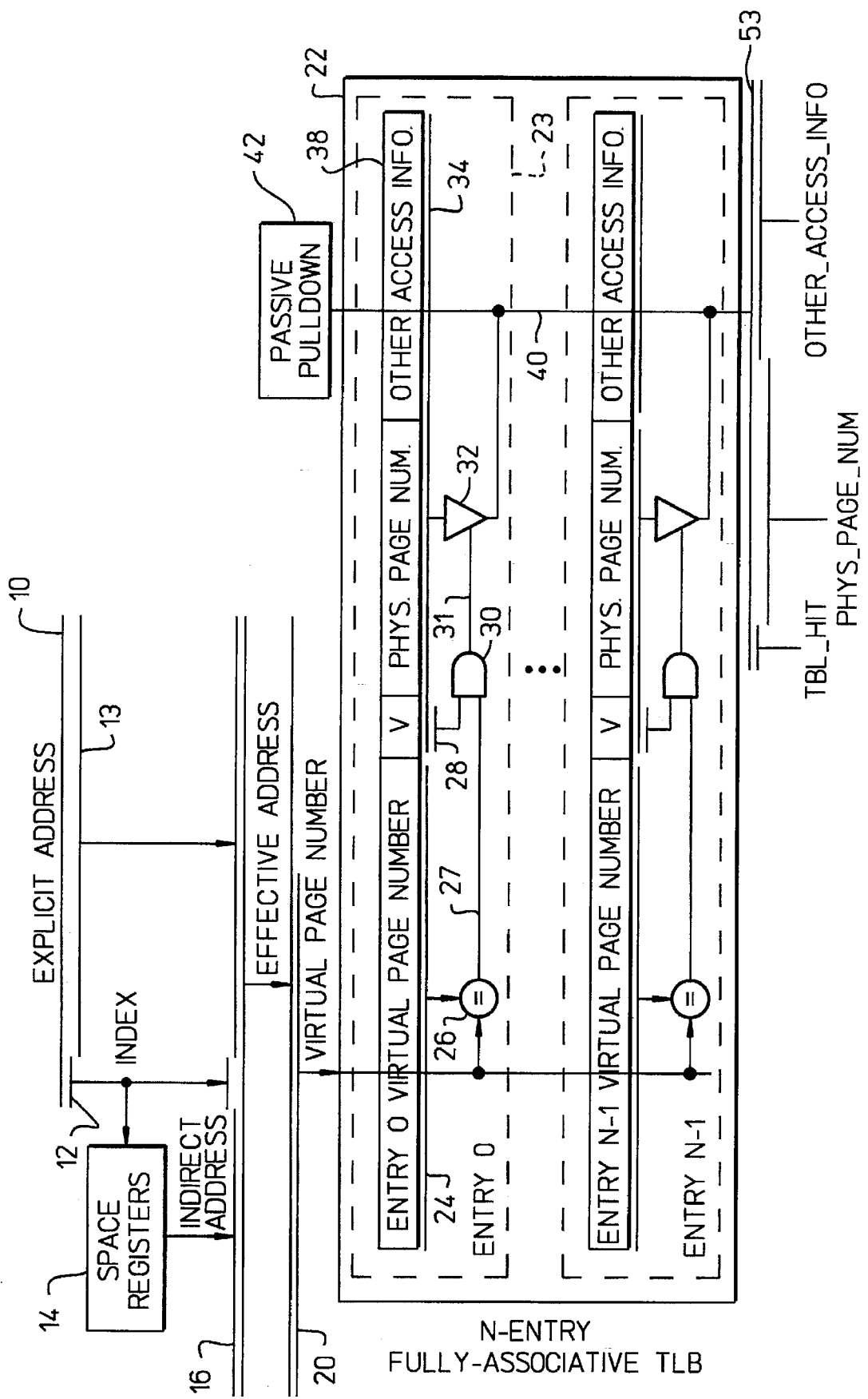
FIG. 2 is a is a partial schematic, partial block diagram of a known TLB system in which index bits form part of the effective address.

The invention is most efficiently described with reference to existing prior art designs. Two prior art translation lookaside buffer (TLB) designs are shown in FIGS. 1 and 2. The TLB 22 shown in FIG. 1 includes an explicit address 10, which is the virtual address from a central processing unit (CPU). The explicit address is composed of two contiguous bit fields: index bits 12 and base bits 13. Typically, for a 32-bit explicit address there are two bits in the index 12 and thirty bits in the base. The index bits 12 index into a bank of space registers 14 to select one of the space registers in the bank which in turn contains an indirect address. The space registers are pointers to individual address segments of a current process. For example, the space registers could point to: a user program space, a user data space, a global data space, and a supervisor space.

The selected space register provides an indirect address 16 which is concatenated to the base bits 13 to form an effective address 18. The effective address 18 is partitioned into a virtual page number 20 and a page offset (not shown). The number of bits in the page offset are determined by the size of the pages as is known in the art, and the number of bits in the virtual page number 20 must be sufficient to address each of the (N) entries in the TLB 22. For example, for a page size of 2048 bytes, an explicit address of 32 bits and an indirect address of 32 bits, the page offset consists of eleven bits and the virtual page number 20 consists of fifty-one bits.

The TLB 22 is organized as a fully associative memory with N entries. Each entry can hold one virtual-to-physical page number translation plus other access information, and consists of a number of individual fields. TLB entry 0, for example, consists of a virtual page number 24, a valid bit 28, a physical page number 36, and other access information 38. The number of bits in each field in the entry is determined by, inter alia, the size of the virtual and physical address spaces. The number of bits in the virtual page number 24, however, must match the number of bits in the virtual page number 20, e.g., fifty-one bits. Additional hardware is provided for each table entry, as illustrated by comparator 44 AND gate 48 and driver 50 in the case of entry N−1.

Assuming the entry is valid, i.e., the valid bit 28 is at a logic high state, the physical page number 36 is the virtual to physical address translation for the effective address 18 having a virtual page number 20 equal to virtual page number 24. The other information 38 includes additional information about the associated entry, e.g., an access identifier.

Although shown in FIG. 1 as a single block, the TLB 22 can consists of separate memory blocks to optimize speed, silicon area, and cost. For example, the virtual page number entries can be stored in a separate faster memory. Ideally, the SRAM is chosen to allow the TLB address translation to occur within a single CPU clock cycle. However, as described below, single cycle access times are not always possible using this design. Therefore, additional load delay slots are necessary or, alternatively (and even more costly in terms of performance), the clock cycle can be lengthened.

A second embodiment of a prior art TLB is shown in FIG. 2. The embodiment of FIG. 2 is identical to that of FIG. 1 except that the index bits 12 are included in the effective address. To account for including the index bits 12 in the effective address, the number of bits in the virtual page numbers in the TLB must increase by the number of index bits. Therefore, the size of the TLB memory and the size of the comparators must increase proportionally, which typically results in an even slower TLB. The resulting virtual address space for the FIG. 2 embodiment is greater than for the FIG. 1 embodiment, however.

In operation, TLB 22 simultaneously compares the virtual page number 20 to all of the virtual page numbers stored in the TLB 22. If the page number 20 matches a page number of one of the entries, and the entry is valid, the corresponding physical page number is selected. For example, virtual page number 20 is compared to virtual page number 24 of entry 0 by comparator 26. The virtual page number 24 acts as a "tag" to identify the corresponding physical page number 36. The output of comparator 26 is coupled to AND gate 30 via line 27. Also coupled to the AND gate 30 is the valid bit 28. The output of the AND gate 30 is coupled to an enable input of a tristate driver 32 via line 31. If the output of the comparator 26 and the valid bit are both high, there is a "hit" at that entry location. If there is a "hit," the tristate driver 32 is enabled and the TLB data 34 is driven onto bus 40. The data driven onto bus 40 is the physical address translation 53 for the explicit address 10. The physical address translation 53 consists of TLB hit bit 54, physical page number 56, and other access information 58. The TLB hit bit 54 corresponds to the valid bit 28 of the entry 23. Passive pulldown 42 is used to pull the TLB hit bit 54 low when there is not a "hit" in the TLB 22.

The time required to perform an address translation using either TLB is equal to the sum of all of the individual delays. There is limited parallelism in the TLB designs of FIGS. 1 and 2. The only parallel activity is the simultaneous comparison of all the virtual page number tags (for each of the entries) to the accessing virtual page number address of the TLB entry, everything else is performed serially.

Figure 3:
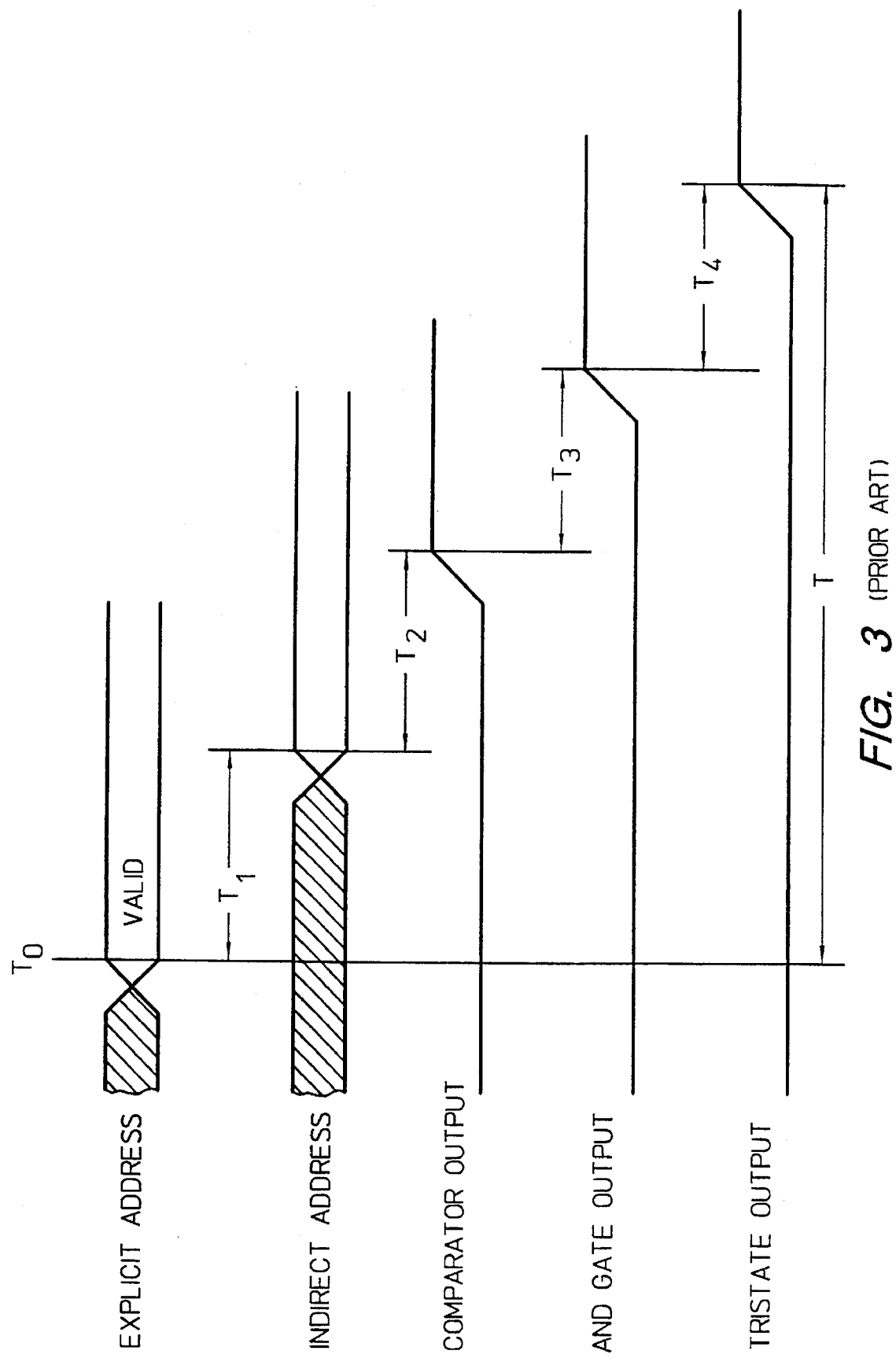
FIG. 3 is a timing diagram illustrating operation of the prior art TLBs of FIGS. 1 and 2.

The address translation sequence for the prior art TLB designs of FIGS. 1 and 2 is shown in FIG. 3. The sequence shown in FIG. 3 is described with reference to entry 0 of FIG. 1, however, the sequence is the same for all entries. Address translation begins at time $T_0$ when the explicit address 10 is valid. Index bits 12 of the explicit address 10 index into the space registers 14. A register read access time $T_1$ later, the indirect address 16 is output from the space registers 14 to form the effective address 18. The output of the comparator is valid after a delay $T_2$ through comparator 26. Next, assuming the entry's valid bit 28 is set, there is a delay $T_3$ through the AND gate 30. After the output of the AND gate 30 is valid, there is a delay $T_4$ until TLB data 34 is driven onto the data bus 40. Therefore, the address translation time T is equal to:

$$T=T_1+T_2+T_3+T_4$$

The space register read access time $T_1$ and the comparator delay time $T_2$ are the principle components of the total translation time T. The invention, described in detail below, minimizes both of these components, resulting in significant time savings to perform the virtual to physical address translation.

Figure 4:
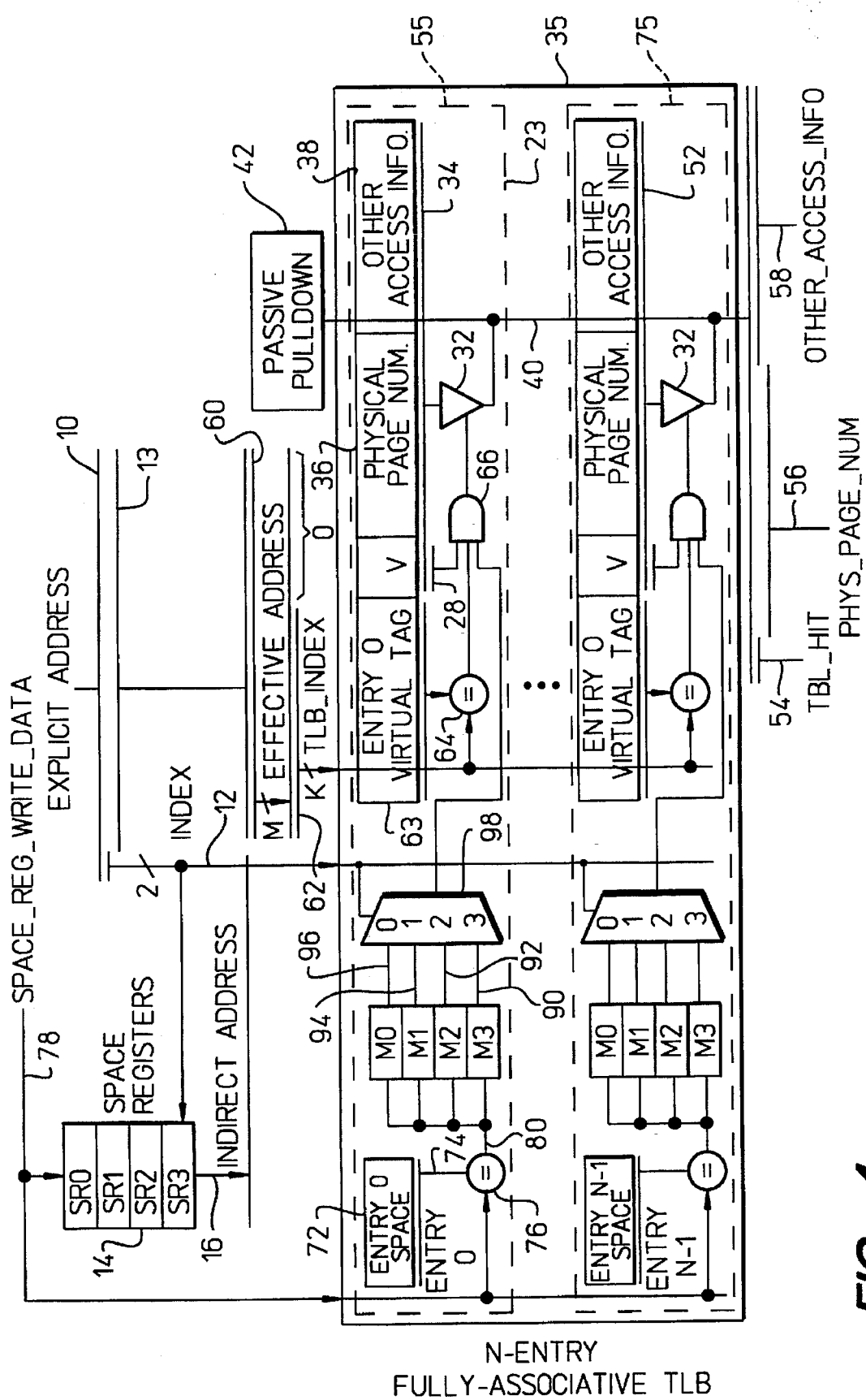
FIG. 4 is a partial schematic, partial block diagram of a new TLB system according to the present invention in which index bits are not included in the effective address.

Referring now to FIG. 4, a TLB 35 is shown, according to the invention, where the index bits 12 are not included in an effective address 60. The TLB 35 corresponds to the prior art TLB of FIG. 1, however, the translation time for TLB 35 is substantially reduced. The TLB 35 shown in FIG. 4 retains like reference numerals from FIG. 1 for like parts. Translation time T is reduced, according to the invention, by removing the indirect address 16 from the virtual page numbers stored in the TLB entries. This eliminates the space register read access time $T_1$ from the translation time T, and also significantly reduces delay through the comparator ($T_2$) since significantly fewer bits are compared.

The explicit address 10 is again decomposed into the index bits 12 and base bits 13. However, unlike in FIG. 1, the indirect address 16 is not appended to the base bits 13 to form the effective address 60. Instead, the effective address 60 consists simply of the base bits 13 of the explicit address 10. The effective address is partitioned into a TLB index 62 and an offset (O). The TLB index 62 consists of the K upper bits of the effective address. The number of bits K in the TLB index 62 is determined by the following equation:

$$K = E - I - \log_2(N)$$

where
E=number of bits in the explicit address;
I=number of bits in the index; and
N=size of page.

In the preferred embodiment: E=32; , I=2, N=2048, and, therefore, K=19.

The TLB entries of TLB 35 are considerably different than the prior art TLB entries. For example, a TLB entry 0 includes a virtual tag 63, entry space tag 72, matching bit memory cells M0–M3, and multiplexer 98, in addition to the physical page number 36, other access information 38, and other associated components of the prior art designs described above. Each entry of TLB 35 is substantially identical, therefore, an exemplary TLB entry 55 will be described in detail which will enable one skilled in the art to construct TLB 35 having N such entries.

TLB entry 55 includes an entry space tag 72 which stores an indirect address 74 associated with the physical page number 36. The indirect address 74 is coupled to a first input of comparator 76. A space register write data bus 78 is coupled to a second input of the comparator 76. Comparator output is coupled to the data inputs of matching bit memory cells M0, M1, M2, M3 via line 80.

Each matching bit memory cell is an individually addressable, single bit memory cell. A method of updating the memory cells is described further below with respect to FIG. 5. The number of matching bit memory cells is equal to the number of space registers 14. Each memory cell is associated with a particular space register. In the embodiment shown in FIG. 4, there are four space registers and, therefore, four matching bit memory cells. Each matching bit memory cell indicates by its state whether or not the entry space tag (e.g. 72) matches the corresponding space register file entry.

The outputs of memory cells M0, M1, M2 and M3 are coupled to the inputs of multiplexer 98 via matching bit lines 96, 94, 92 and 90, respectively. The select inputs of multiplexer 98 are coupled to index bits 12. Thus, whereas index bits 12 conventionally were used to select a space register, the index bits 12 now select the output of the corresponding matching bit memory cell.

The output of the multiplexer 98 is coupled to an input of a three input AND gate 66 via line 70. Also coupled to an input of AND gate 66 is the valid bit 28. The third input of AND gate 66 is coupled to an output of comparator 64. The inputs of comparator 64 are coupled to the TLB index 62 and the virtual tag 63. The output of AND gate 66 is coupled to the enable input of tristate driver 32. Thus, tristate driver 32 is enabled when the selected matching bit is high, the tag 63 is equal to the TLB index 62, and the valid bit 28 is high.

One advantage of TLB 35 over the prior art is that the indirect address comparison is carried out ahead of time. This advantage will become more apparent with a detailed description of the matching memory cells that follows.

Figure 5:
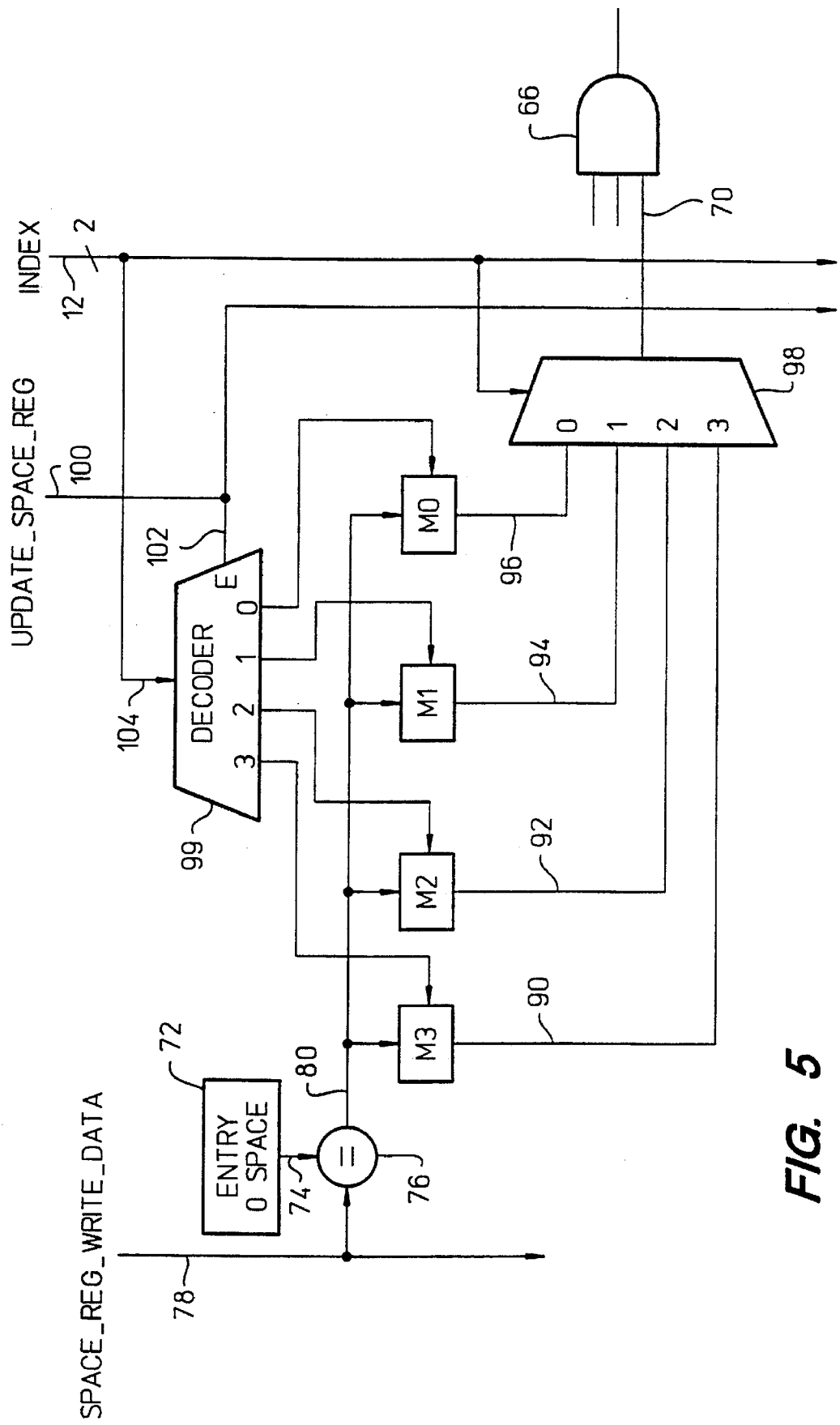
FIG. 5 is a schematic diagram showing detail of the matching bit memory circuitry of the TLB system of FIG. 4.

Referring now to FIG. 5, an expanded schematic diagram of the matching bit memory cells M0–M3 and associated circuitry is shown for a typical TLB entry. In addition to the components shown in FIG. 4, a conventional 2-to-4 decoder 99 having an enable input 102 is added. The select inputs 104 of decoder 99 are preferrably connected to the index bits 12, but other signals could be used to similarly indicate which of the space registers 14 is being updated. Enable input 102 is coupled to an update space register control line 100, which is enabled whenever the space registers 14 are updated, hence the name. The outputs of decoder 99 are coupled to the write inputs of memory cells M0, M1, M2 and M3, respectively. Although only four memory cells are shown in FIG. 5, the invention can be extended to any number of memory cells, as long as there is a one-to-one correspondence between the number of memory cells and the number of space registers.

Decoder 99 causes data at the output of comparator 76, present on line 80, to be written into a selected memory cell whenever a space register is updated. The space registers are typically updated each time a process is swapped out of memory. The memory cell selected is determined by the state of the index bits 12. Thus, whenever a space register is updated the corresponding memory cell is updated.

The value written into each selected memory cell is dependent on the contents of the entry space tag 72 and the data written to the corresponding space register. When a space register is updated, i.e., written to, the desired space register data is driven onto space register write data bus 78 and the update space register control line 100 is asserted. The tag 72 is then compared by comparator 76 to the data on the register data bus 78 being written to one of the space registers. The result of this comparison is written into the memory cell corresponding to the space register currently being updated, as described above.

One memory cell in each entry is updated simultaneously since the space register write data bus 78, update space register control line 100, and index bits 12 are coupled to each entry in a substantially similar manner. Thus, for the embodiment shown in FIG. 5, a write to each of the four space registers 14 in FIG. 4 updates all of the matching bit memory cells in the TLB 35. The memory cells and the space registers 14 are updated not only when the contents of the space registers 14 are modified, but also when a TLB entry is replaced.

Once the results of the comparisons are stored in the memory cells, they are available within one multiplexer delay $T_M$ after the index bits 12 become valid. The performance benefits to the address translation time will become apparent when the timing sequence is described in detail below.

Figure 6:
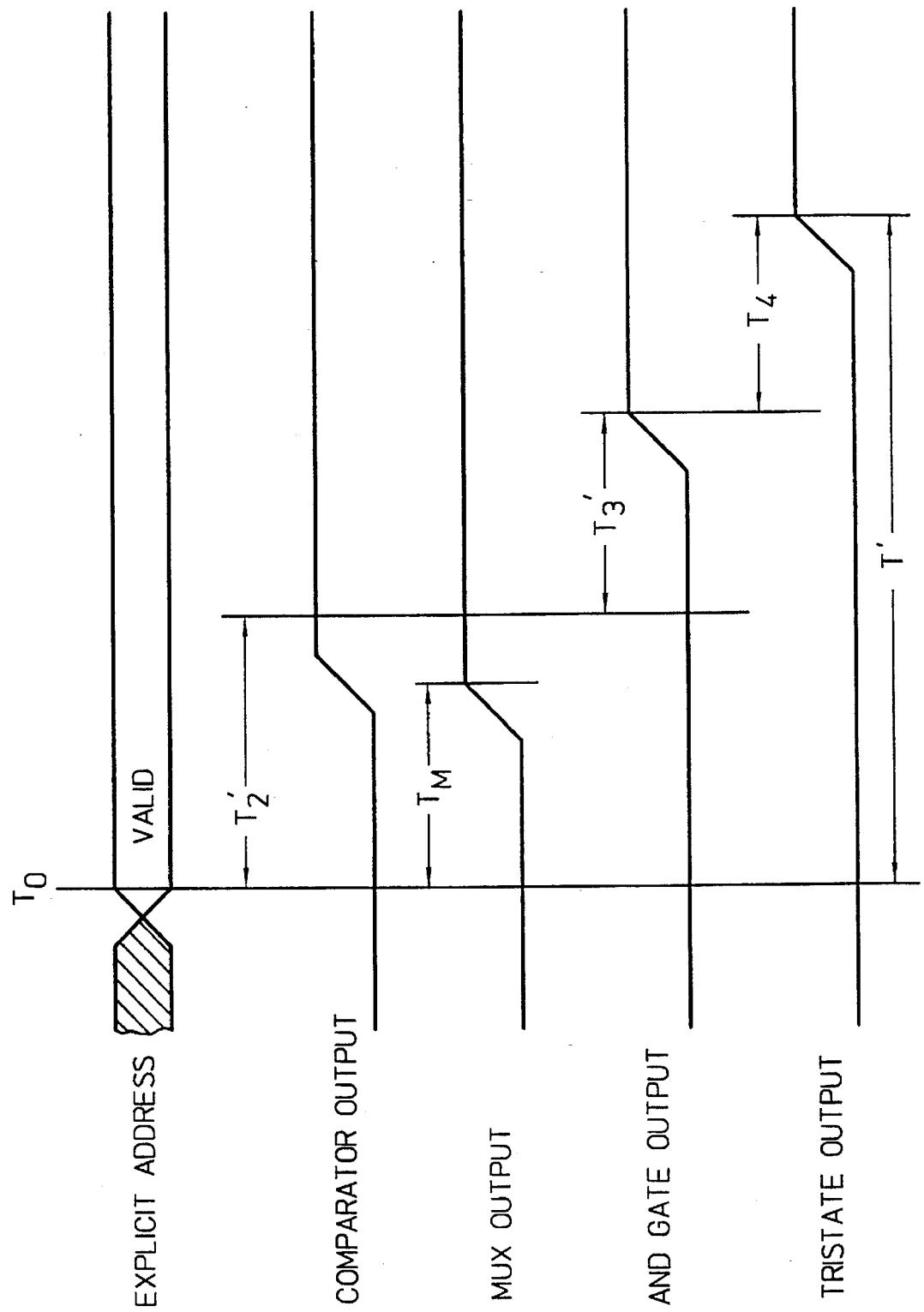
FIG. 6 is a timing diagram for a virtual address translation according to the present invention.

Referring now to FIG. 6, a timing diagram is shown for a virtual to physical address translation using the TLB 35 of FIG. 4. The translation sequence is described with respect to entry 0 but the sequence is identical for all N entries. The translation sequence begins when the explicit address becomes valid at time $T_0$. From that point, virtual tag comparator 64 operates concurrently with mux 98. Typically, a delay $T_2'$ through the comparator 64 exceeds the delay $T_M$ through the multiplexer 98, as shown in FIG. 6. Note that the delay $T_1$ due to the space register read has been completely eliminated. This alone results in a substantial decrease in the total address translation time T'.

Further reduction in the total address translation time T is achieved by a reduction in a delay $T_2'$ through the comparator 64. The virtual tag 63 is considerably smaller than the virtual page numbers of the prior art. This is a result of excluding the indirect address 16 from the virtual tag 63. Instead, the indirect address is stored in the entry space tag 72 and compared in advance of a TLB access, as described above. As is known in the art, delay through comparator 64 is roughly proportional to the number of bits in the input. In the preferred embodiment, virtual tag 63 has only nineteen bits. In contrast, the prior art TLB 22 (FIG. 1) has a virtual page number (24) of fifty-one bits for the same virtual address space. Therefore, the delay $T_2'$ through the comparator 64 is significantly less than the delay $T_2$ through the comparator 26 in FIG. 1. The reduction in the delay $T_2'$ through the comparator is added to the elimination of read access time $T_1$ to produce a significantly reduced total translation time T', according to the invention.

After the comparator output is valid, assuming that the multiplexer 98 output is also valid at time $T_2'$, there is a delay $T_3'$ through AND gate 66. Although the delay $T_3'$ through the three input AND gate 66 is slightly greater than the delay $T_3$ through the two input AND gate 30 of the prior art, this increase is more than offset by the reductions. Once the output of AND gate 66 is valid, the tristate driver 32 requires a time $T_4$ to drive the TLB data 34 onto bus 40. This is the same time $T_4$ as required in the prior art. Thus, the total translation time T' for the TLB 35 is described by the following expression:

$$T' = T_2' + T_3' + T_4 \text{ (assuming } T_M < T_2'\text{)}$$

The total time T' is significantly less than the total time T required by the prior art TLB of FIG. 1.

Figure 7:
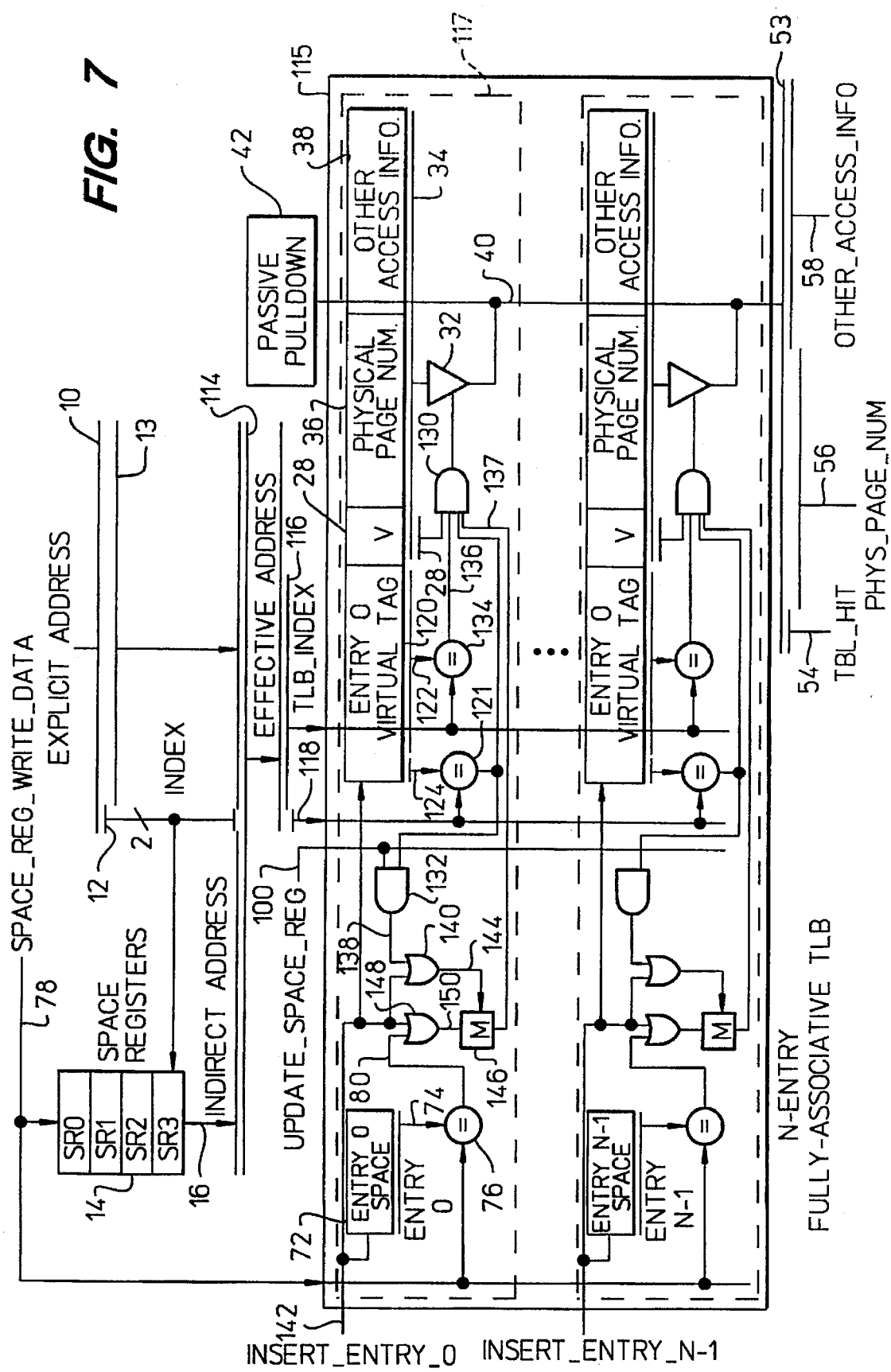
FIG. 7 is a partial schematic, partial block diagram of an alternative TLB system according to the present invention in which index bits are included in the effective address.

The same inventive principle can be extended to a TLB design 115 shown in FIG. 7 where the index bits 12 are included in the effective address 114. As with the TLB design of FIG. 5, the organization of each TLB entry is identical. Thus, the following description will describe in detail a single TLB entry 117, which accordingly describes the entire TLB 115.

TLB entry 117 comprises an entry space tag 72, a virtual tag 120, a valid bit 28, a physical page number 36, and other access information 38. The virtual tag 120 includes two contiguous tags: an upper index tag 124 and a lower virtual tag 122. The lower virtual tag 122 and TLB index 116 are coupled as inputs to a comparator 134 in a conventional manner. The size of comparator 134, in terms of the number of bits, is the same as comparator 64 in FIG. 4. Thus the time delay through the comparator 134 should be comparable. Comparator 121 has a first input coupled to the index bits 118, a second input coupled to the upper index tag 124, and an output. Although the index bits 118 are shown distinct from index bits 12, they are actually the same lines.

The TLB entry 117, however, has only a single matching bit memory cell 146 for storing the results of the comparator 76. The matching memory cell 146 serves a similar function as the matching memory cells M0–M3 used in the TLB entry 55 of FIG. 4. Memory cell 146 has a data input, a write enable input, and a data output. The logic associated with the memory cell provide a means for updating the memory cell when a corresponding space register is modified, as described next.

The updating logic includes a first OR gate 148 which has a first input coupled to the output of the comparator 76 via line 80, a second input coupled to an insert entry line 142, and an output coupled to the data input of the memory cell 146 via line 150. The updating logic also includes a second OR gate 140 which has a first input coupled to the "insert entry" line 142, a second input, and an output coupled to the write enable input of the memory cell via line 144. Finally, the updating logic includes an AND gate 132 which has a first input coupled to the update space register control line 100, a second input coupled to the output of comparator 121, and an output coupled to the second input of OR gate 140 via line 138.

The updating logic operates under control of the insert entry line 142 and the update space register control line 100. As described above, the update space register control line 100 is asserted when space registers 14 are updated. The insert entry line 142, on the other hand, is asserted when the particular TLB entry 117 is modified. Thus, each TLB entry has a unique insert entry line, as shown in FIG. 7.

The OR gate 148 controls the value presented at the data input of the memory cell 146. The value at the input of the memory cell 146 will be asserted when either the insert entry line 142 or the output of the comparator 76 is asserted. The data presented at the memory cell input on line 150 will only be stored in the memory cell, however, when a signal on line 144 is asserted. The signal on line 144 is controlled by AND gate 132 and OR gate 140.

There are two cases where the signal on line 144 is asserted. The first is when a signal on insert entry line 142 is asserted, i.e., when TLB entry 117 is updated. This is also the case where the signal at the data input of the memory cell is asserted. Thus, every time a TLB entry 117 is modified, the corresponding matching memory cell 146 is updated to the asserted state. The TLB matching memory cell 146 is automatically set to the asserted state because the TLB entry is assured of matching one of the indirect addresses stored in the space registers 14 following an operating system trap to service a TLB miss.

The second case where the signal on line 144 is asserted and, therefore, the memory cell 146 is updated, is where the output of AND gate 132 is asserted. The output of the AND gate is asserted when the signal on the update space register line 100 is asserted and the output signal from comparator 121 is asserted. The signal on the update space register line 100 is asserted when a space register is being updated. The output of comparator 121 is asserted when the upper index tag 124 is equal to the index bits 118. The index bits 118 indicate the particular register number being written to when update space register signal is asserted. Thus, when the space register corresponding to the upper index tag 124 is updated, the matching memory cell is updated.

The value stored in the memory cell in the second case is determined by the output of comparator 76. As described above, when a space register is updated the new value of the space register is written to the space register on space register write data bus 78. The data on the write data bus 78 is simultaneously compared to the entry space register 72 by comparator 76. If the two are equal, the output of the comparator 76 is asserted on line 80 and the matching memory cell 146 is updated to the asserted value. If the two are not equal, the cell 146 is updated to a non-asserted value.

A TLB "hit" in TLB entry 117 is determined by a four-input AND gate 130. A TLB hit occurs when all four of the inputs to the AND gate 130 are asserted. The first input is coupled to the valid bit 28. The second input is coupled to the output of comparator 134 via line 136. The third input is coupled to the output of the comparator 121. The fourth input is coupled to the output of the matching memory cell 146 via line 137. The output of the AND gate is coupled to the enable input of tristate driver 32. Thus, when there is a hit, the contents of the TLB entry are driven onto the data bus 40. Otherwise, the passive pull-down network 42 keeps the data bus 40 at a logic low. Therefore, if there is a hit, the valid bit, i.e., the most-significant-bit on the bus 40, will so indicate.

Once the matching memory cells are set to their appropriate values, as described above, the address translation proceeds as follows. The explicit address is partitioned into an index 12 and a base 13. The base 13 is then partitioned into a TLB index 116 and an offset (not shown). The TLB index 116 is compared with the virtual tag 122. Simultaneously, the upper index tag 124 is compared to the index bits 118, which are identical to the index bits 12 of the explicit address 10. A TLB hit occurs for this embodiment if the following conditions are met within a single TLB entry: the TLB index comparison (via 134) and the index comparison (via 121) are both affirmative, the valid bit 28 is asserted, and the value of the corresponding matching memory cell 146 is asserted. If a hit occurs, the physical page number of the TLB entry wherein the TLB hit occurred is supplied as a portion of the physical address, i.e., as the actual physical page number.

The timing sequence for TLB 115 is substantially similar to that shown in FIG. 6. Thus, the inventive principle herein produces improved memory system performance for both of the common addressing schemes employed in typical computers.

Having described and illustrated the principles of the invention with regards to several embodiments thereof, it should be apparent that the invention can be modified in arrangement and detail without departing from such principles. For example, another implementation of the invention would be to use two index bits to choose between three space registers. Here, one of the index bits would be part of the effective address, while the other would not. The index bit is then used in the TLB address check along with the bits of the explicit address. Each TLB entry will have two address bits b0, b1 and control bits c0, c1. The control bits indicate whether or not the address bits b0, b1 participate in the TLB look-up which is used to select the appropriate TLB entry. The correspondence between the space registers and the address bits b0, b1 and the control bits c0, c1 is shown by the following table, where "x" indicates a "don't care."

| Space Register No. | b0, b1 | c0, c1 |
|---|---|---|
| 0 | 0, 0 | 1, 1 |
| 1 | 0, 1 | 1, 1 |
| 2 | 1, 0 | 1, 1 |
| 0 or 1 | 0, x | 1, 0 |
| 0 or 2 | x, 0 | 0, 1 |
| 1 or 2 | 1, x | 1, 0 |
| 0 , 1 or 2 | x, x | 0, 0 |

This alternative embodiment as well as the other embodiments can be generalized to different sizes. Thus, we claim all modifications and variation coming within the spirit and scope of the following claims.

What is claimed is:

1. A method of translating an virtual address comprised of an indirect address and an explicit address into a physical address comprising:
    (a) providing a translation look-aside buffer (TLB) organized as N entries, each entry having a virtual tag, a valid bit, a physical page number, and an entry space tag;
    (b) partitioning the explicit address into an index and a TLB index;
    (c) comparing the TLB index with a virtual tag;
    (d) comparing, prior to the comparing (c), the indirect address with an entry space tag;
    (e) generating a TLB hit when the TLB index comparison and the indirect address comparison are both affirmative for the same TLB entry; and
    (f) supplying the physical page number of the TLB entry wherein the TLB hit occurred as a portion of the physical address.

2. A method according to claim 1 wherein the comparing the indirect address with an entry space tag includes:
    writing an indirect address to a space register;
    comparing the indirect address written to the space register to the entry space tag; and
    storing the results of the comparison.

3. A method according to claim 2 wherein the writing, comparing, and storing steps are repeated for each space register in a space register file.

4. A method according to claim 2 wherein the comparing and storing steps are carried out whenever the space register is updated or a TLB entry is replaced.

5. A method according to claim 4 wherein a selecting step comprises selecting one of 2^N matching bits where N is the number of bits in the index.

6. A method according to claim 1 wherein the partition step comprises partitioning the explicit address into the index and a base, and partitioning the base into the TLB index and an offset.

7. A method of translating an explicit address according to claim 1 wherein the comparing step comprises comparing the TLB index with the virtual tag of all the TLB entries.

8. A method according to claim 1 wherein one of the comparing steps further comprises comparing the index with an upper index tag.

9. An address translation apparatus for translating an explicit address within an address space into a physical address, the explicit address comprised of an index, a TLB index, and an offset, the translation apparatus comprising:
    a space register file having a plurality of space registers, each space register having an indirect address for a corresponding index value; and
    a memory organized as N TLB entries, each entry having an entry space tag, a virtual tag, a valid bit, and a physical page number,
    TLB index comparision means for comparing only the TLB index to the virtual tag, and
    means for supplying a physical page number as part of the physical address when the TLB index and the virtual tag corresponding to the physical page number are equal and when the indirect address corresponding to the index and the entry space tag corresponding to the physical page number are equal.

10. An address translation apparatus according to claim 9 wherein the comparing means comprises a first comparator having a first input coupled only to a virtual tag, a second input coupled only to the TLB index, and an output.

11. An address translation apparatus according to claim 9 wherein the supplying means comprises:

a space register write data bus coupled to the space register bank for modifying the contents of the space registers;

a second comparator having a first input coupled to an entry space tag, a second input coupled to the space register write data bus, and an output;

matching bit memory means for storing the results generated by the comparator having an input coupled to the second comparator output and an output;

selection means coupled to the output of the matching bit memory for selecting a matching bit corresponding to the index.

12. An address translation apparatus according to claim 11 wherein the matching bit memory means comprises:

a first number of single bit memory cells, each memory cell having a data input coupled to the output of the second comparator, a write input, and an output; and a decoder having a select input coupled to the index, an enable input coupled to an update space register control line, and a first number of outputs, each decoder output coupled to the write input of a corresponding memory cell.

13. An address translation apparatus according to claim 12 wherein the selection means comprises a multiplexer having a first number of inputs, each input coupled to a corresponding memory cell, a select input coupled to the index for selecting one of the first number of inputs, and an output coupled to the supplying means.

14. An address translation apparatus according to claim 11 wherein the supplying means further comprises:

a data bus;

a three-input AND gate having a first input coupled to a valid bit, a second input coupled to an output of the TLB index comparison means, a third input coupled to the output of the selection means, and an output for generating a TLB hit;

a passive pulldown network coupled to the data bus for pulling the data bus down when there is no hit in the TLB; and a tristate driver having an input coupled to the valid bit and a physical page number, an enable input coupled to the output of the three-input AND gate, and an output coupled to a data bus for supplying the physical page number as part of the physical address when there is a TLB hit.

15. An address translation apparatus according to claim 10 wherein the comparing means comprises:

a second comparator having a first input coupled to the index bits, a second input coupled to an upper index tag, and an output coupled to the supplying means.

16. An address translation apparatus according to claim 11 wherein the matching bit memory means comprises:

a single bit matching memory cell having a data input, a write enable input, and a data output; and means for updating the memory cell when a corresponding space register is modified.

17. An address translation apparatus according to claim 16 wherein the updating means comprises:

a first OR gate having a first input coupled to the output of the second comparator, a second input coupled to an insert entry line, and an output coupled to the data input of the memory cell;

a second OR gate having a first input coupled to the insert entry line, a second input, and an output coupled to the write enable input of the memory cell; and an AND gate having a first input coupled to a update space register control line, a second input, and an output coupled to the second input of the second OR gate.

18. An address translation apparatus according to claim 17 wherein the supplying means further comprises:

a data bus;

a four-input AND gate having a first input coupled to a valid bit, a second input coupled to an output of the TLB index comparison means, a third input coupled to the output of the second comparator, a fourth input coupled to the output of the matching memory cell, and an output for generating a TLB hit;

a passive pulldown network coupled to the data bus for pulling the data bus down when there is no hit in the TLB; and a tristate driver having a data input coupled to a physical page number, an enable input coupled to the output of the four-input AND gate, and an output coupled to a data bus for supplying the physical page number as part of the physical address when there is a TLB hit.

19. In a virtual memory system having a space register file for storing indirect addresses, a method of speeding TLB translation of an explicit address having base bits and index bits into a physical address, the method comprising:

providing an entry space tag associated with each entry in the TLB;

updating an entry space tag whenever the corresponding TLB entry is updated;

updating the space register file with a new indirect address;

comparing the new indirect address to a space entry tag; and storing the results of the comparison in an associated matching bit memory cell for use during a subsequent TLB access.

20. A method of speeding TLB access according to claim 19 further comprising selecting a matching bit memory cell responsive to the index bits.

21. An address translation apparatus for translating a virtual address into a physical address, the virtual address including an indirect address and an explicit address, the explicit address comprised of a first index and a second index, said apparatus comprising a memory having N entries, each entry having an entry space tag, a virtual tag, and a physical page number, each of said entries including at least a first comparator for comparing the second index to the virtual tag;

a second comparator for comparing the entry space tag of each of the N entries with the indirect address; and an output unit for outputting a physical page number as part of the physical address when the second index and the virtual tag corresponding to the physical page number are equal and when the indirect address corresponding to the first index and the entry space tag corresponding to the physical page number are equal.

22. An address translation apparatus according to claim 21, wherein the comparing by the second comparator is completed prior to the comparing by the first comparator.

* * * * *